United States Patent [19]

Serrano et al.

[11] Patent Number: 5,065,854
[45] Date of Patent: Nov. 19, 1991

[54] SECURITY AND REGULATION MECHANISM TO BE USED AS INSTANTANEOUS ANTIRETURN SYSTEM IN BOTH ROTATIONAL TURNS LEVOTURN AND DEXTROTUR

[76] Inventors: Martin S. Serrano; Antonio H. Sanz, both of c/Foresth, 4, Tres Cantop, Madrid, Spain

[21] Appl. No.: 472,667

[22] Filed: Jan. 30, 1990

[30] Foreign Application Priority Data

Feb. 1, 1989 [ES] Spain .................................. 8.900.345

[51] Int. Cl.⁵ .............................................. F16D 67/00
[52] U.S. Cl. ........................................ 192/8 R; 192/7
[58] Field of Search ................... 192/7, 8 R; 188/134

[56] References Cited

U.S. PATENT DOCUMENTS 3,051,282 8/1962 Greene .................................. 192/8 R
4,591,029 5/1986 Da Foe ........................... 192/8 R X
4,706,791 11/1987 Magliano ............................ 192/7 X

*Primary Examiner*—Rodney H. Bonck
*Attorney, Agent, or Firm*—Zarley, McKee, Thomte, Voorhees & Sease

[57] ABSTRACT

An anti-return system for both rotational directions including a cylindrical casing with a peripheral braking surface, a plurality of brake shoes guided on a rolling track, an input shaft coupled to the brake shoes and an output shaft mounted on the input shaft.

7 Claims, 10 Drawing Sheets

SECURITY AND REGULATION MECHANISM TO BE USED AS INSTANTANEOUS ANTIRETURN SYSTEM IN BOTH ROTATIONAL TURNS LEVOTURN AND DEXTROTUR

BACKGROUND OF THE INVENTION

This present invention deals with a regulation and safety device to be used as an instantaneous anti-return system for both directions of rotation, levo and dextro rotational directions.

SUMMARY OF THE INVENTION

The device fills the void that the prior art mechanical systems utilize for the irreversibility of the mechanical systems, which is thus obtained by means of different procedures and only then, applied in the opposite direction as that of the driving force; in other words, the prior art system could not be started in the opposite direction of that of the driving force. This is not the case of the device of the present invention which can be started in both directions.

Another fundamental and new characteristic in the present invention is that, if acted upon the output axle, the system will not allow a speed change to act upon the input axle which would lead to a perfect synchronization or balance between the rotational speed of the input axle and that of the output axle. Thus, the power absorption by the controlled section will never be greater than the driving power, thus allowing for a constant speed at all times.

If the driven element has a tendency to accelerate, the difference between the available energy on the output axle and that of the input axle, assumed to be constant, would be the energy absorbed by the device. As the device acts instantaneously to responses, the work developed is infinitesimal and thus, the energy would not be dispersed. Consequently, the outcome action of the stresses would be transferred to the device's anchoring points.

Before proceeding with the description of the device, a brief explanation of an anti-reversible and bi-directional device is provided.

Let us imagine a driving system (electric motor, diesel engine, etc.) to which a device is installed in which an output axle of a machine is coupled (capstan, transporting belt, elevator pulley, etc.). Should there be a changing action in the driven machine acting upon the output axle of the device in either of the two possible directions, the action would be counteracted by the machine, without disturbing the speed of the output axle and, therefore, the input velocity of the driving system, since the device has a ratio of 1:1 and thus, the input velocity is equal to the output speed at all times.

The applications of the safety and regulatory device are so ample that any moving machine may incorporate this system as a safety and synchronizing means, thus substituting the present mechanical systems with a greater margin of confidence, including all electrical, hydraulic, pneumatic, etc. systems, which are of greater complexity and thus involves a greater expense.

In the event of a power shortage, breakdown, etc. at any time or in any position in which the system may be at the time, the driving element can be stopped, in which case, the load or driven element would remain in position without any possibility of slippage, skipping, backing-off, fall, or any type of movement by itself (as in cranes, elevators, lifts, transporting belts, redlers, etc.). The driven element will remain in such a position until it is re-started by acting upon the input axle again.

It is of the outmost technical importance and consideration to indicate that, following the basic principle of the invention and without any change in its objectives and listed functions, the constituent shapes and components may have different versions, such as:

Action by means of rollers.
Action by means of pivots.
Mixed action through rollers and pivots.

All the different versions fulfill the same objectives but make possible a variety of assemblies, in order to cover a greater technical and commercial usage. Also, using the same functioning principle, the gear sizes may differ according to the force to be absorbed and thus, the full engineering development of the device would be the determining factor regarding its size, materials to be used and, if needed, the static or dynamic cooling system to be used in order to dissipate the generated heat.

The present invention offers a great field of applications within the industrial area, such as:

A) Area of power transmission. As a coupling system in those power reduction units acting upon machines in which the same must be irreversible:
  Bridge-cranes.
  Capstans.
  Elevators.
  Loading systems, lifters.
  Transporting belts.
  Ski lifts, etc.
  Synchronization in machines.
B) Area of Real Estate:
  Outside power blinds.
  Moving canopies.
  Moving garage doors.
C) Automotive area:
  Power windows.
  Transmission systems.
D) Many more industrial applications.

The present invention may be incorporated to any transmission, such as axle, pinion, wheel, gear, pulley or joint, which may be hand-operated or motorized.

The objective of this invention is to have universal use and application, and facilitating the resolution of problems presently acted upon by unreliable systems. The present invention has simple design, is easy to repair, and is of low manufacturing costs, thereby ensuring its adaptation to international markets of instantaneous anti-return in both directions of rotation.

BRIEF DESCRIPTION OF THE DRAWINGS

In these drawings, the following constituent elements have been shown with the following corresponding reference numerals.

Figure 2:
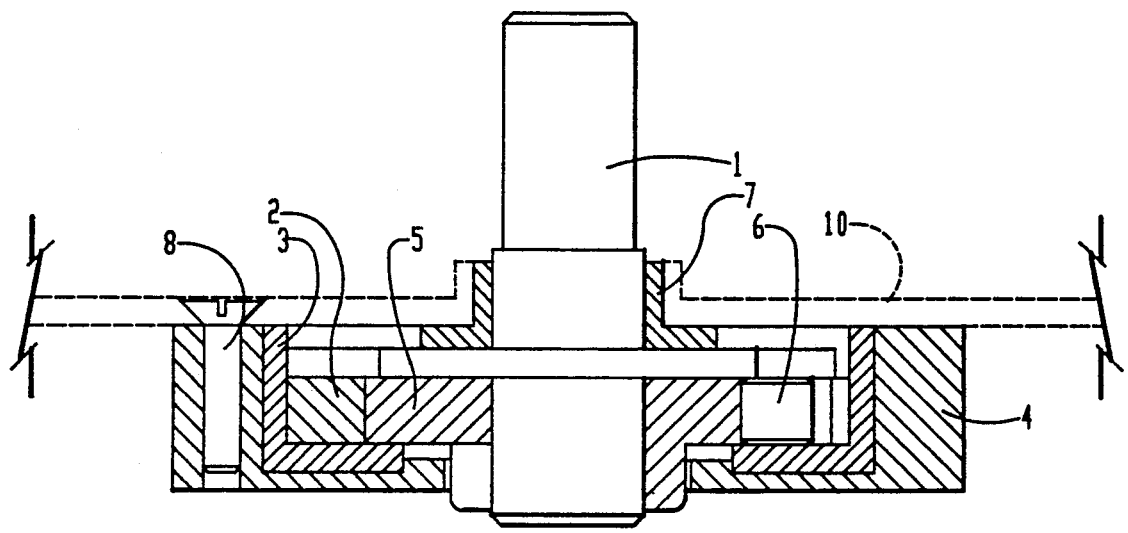
FIG. 2 is a sectional view taken along lines 2—2 of FIG. 1.
Figure 1:
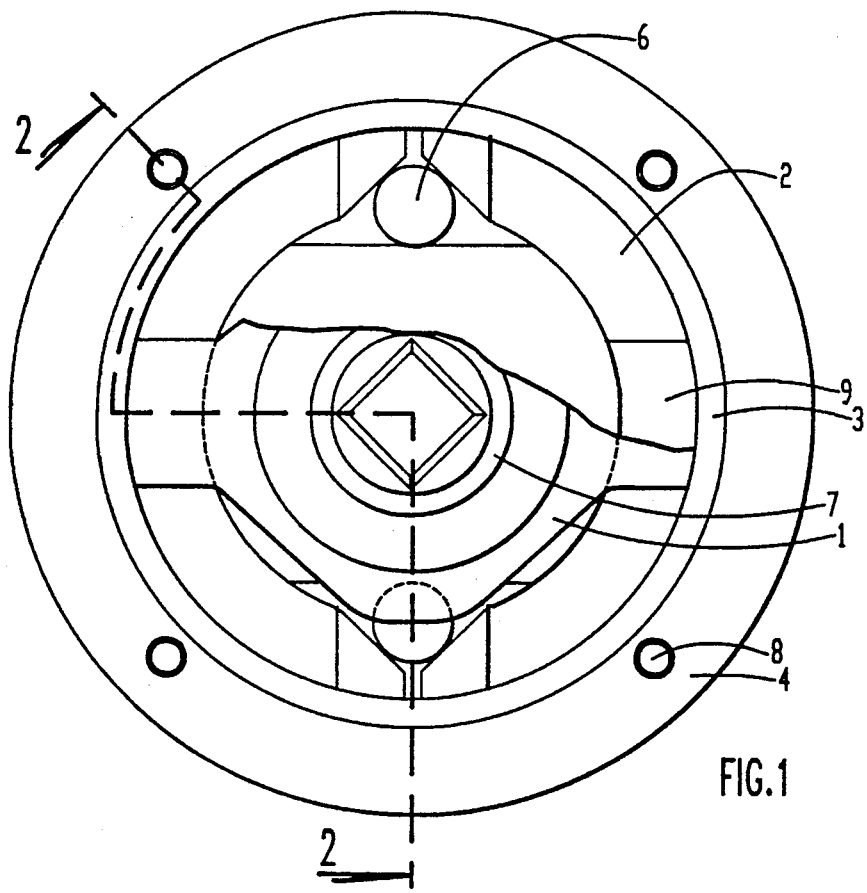
FIG. 1 shows a plan view of the regulatory and safety device of the present invention, viewed from the entrance side.
Figure 3:
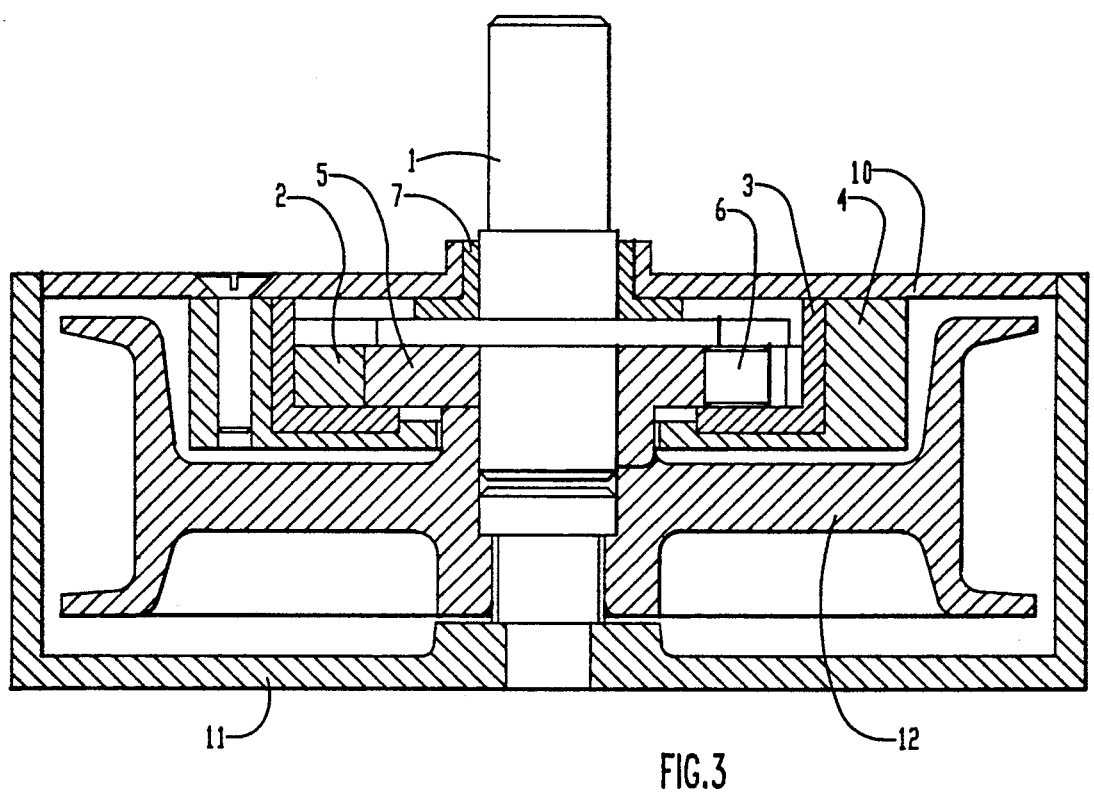
FIG. 3 is a sectional view of the assembled regulatory and safety device.
Figure 4B:
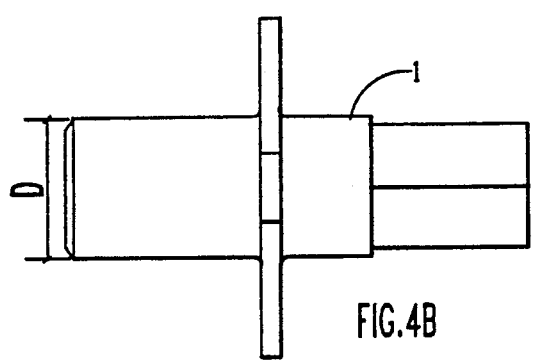
FIGS. 4A-4F show the disassembly of the moving elements of the system with dismounted views indicating, at the same time, the corresponding assembly by means of reference letters.
Figure 4A:
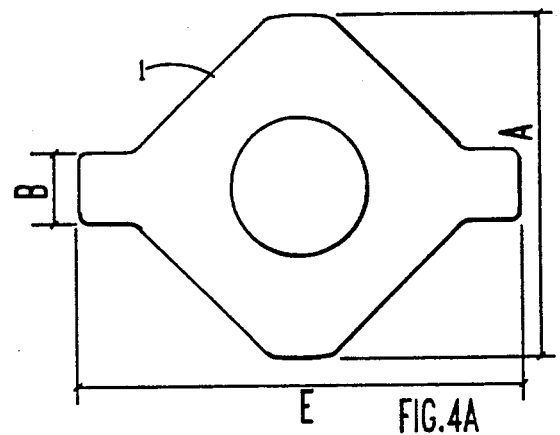
Figure 4D:
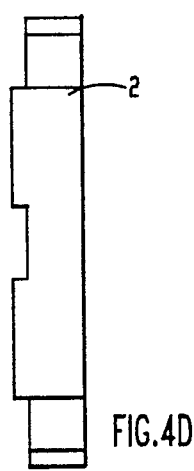
Figure 4C:
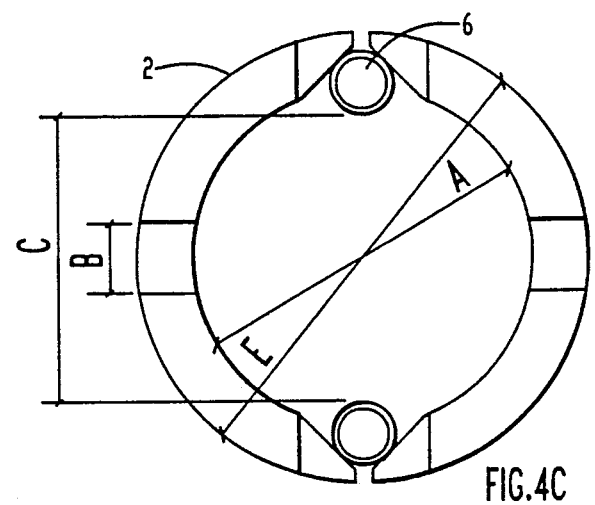
Figure 4F:
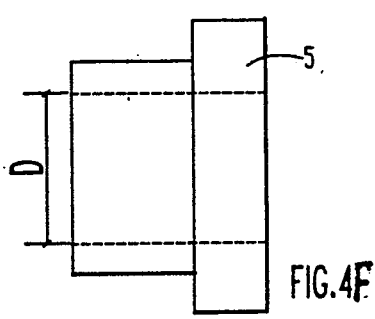
Figure 4E:
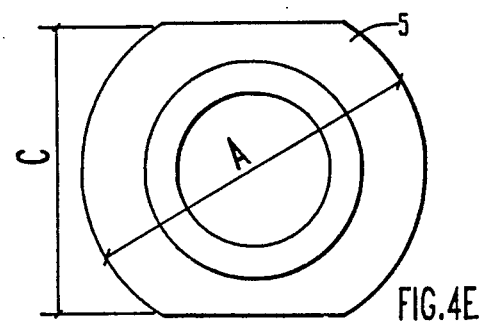

1. Power axle
2. Brake-shoe
3. Rolling track
4. Case
5. Blocking output shaft
6. Rollers
7. Bushings
8. Assembly screws
9. Brake-shoe groove
10. Support lid
11. Housing
12. Transmission driven element
13. Internal components support base
14. Pivoting point
15. Brake-shoe edging
16. Lid fastening screw
17. Tightening washer
18. Adapting spring In reference to the Figures, the whole irreversible mechanism will always be placed between the driving element and the driven element. If the driven element is a gear box which, in turn, drives another machine, the device could be coupled to any of the gear trains.

The device includes by the power input axle or driving shaft (1) mounted on a bushing (7) and equipped with radial projections which are introduced into the grooves (9) of the brake-shoe (2). There can be two or more grooves and in the same number as the number of projections in the driving shaft (1). The brake-shoes are annular segments and are dragged by the projections of the driving shaft (1) during rotation. According to the resisting torque, the size, number and quality of the materials will vary. The brake-shoes (2) will concentrically rotate on the rolling track (3) and in radial contact with the inserted rollers (6). The track is mounted on the case (4). The body of the output shaft (5) is assembled on the input driving shaft (1) and is coupled at its end to the different driven elements (12).

Therefore, if the action or movement originates from the input driving shaft (1), there is no related movement among the different parts previously listed and thus, the movement is gentle between the input driving shaft (1) and the body of the output shaft (5), with both shafts rotating at the same speed.

Should any movement act upon the body of the output shaft (5), it will try to change its rotating speed, which is conditioned by the speed of the input driving shaft (1). The special design of the body of the output shaft (5) with two flat sides, will force the rollers (6) to press upon the brake-shoes (2), thus achieving a pressure effect and, therefore, a braking effect on the rolling track (3), and thus stopping the input driving shaft (1). Upon stopping the body of the output shaft, the corresponding stresses are transmitted to the fastening points or screws (8) of the support lid (10) of the case, as part of the housing.

As a summary, the pressure stress completely stops the system from translating the shear stress upon the fastening points or screws (8) on the support lid (10) of the case (4). These stresses, resulting from the excess of the pair above the nominal point of the driving shaft, also has its reactions on the fastening points of the housing (11), which are the anchoring points to a fixed element (base, wall, etc.).

If, after blocking the system, we wish to re-start the machine in any of the rotating directions, this can be accomplished by means of the special design of the brake-shoes (2) which will tend to displace the rollers (6) towards the inside, therefore eliminating the pressure exerted upon the rolling track (3), with a resulting slow rotation and easy handling.

Figure 5B:
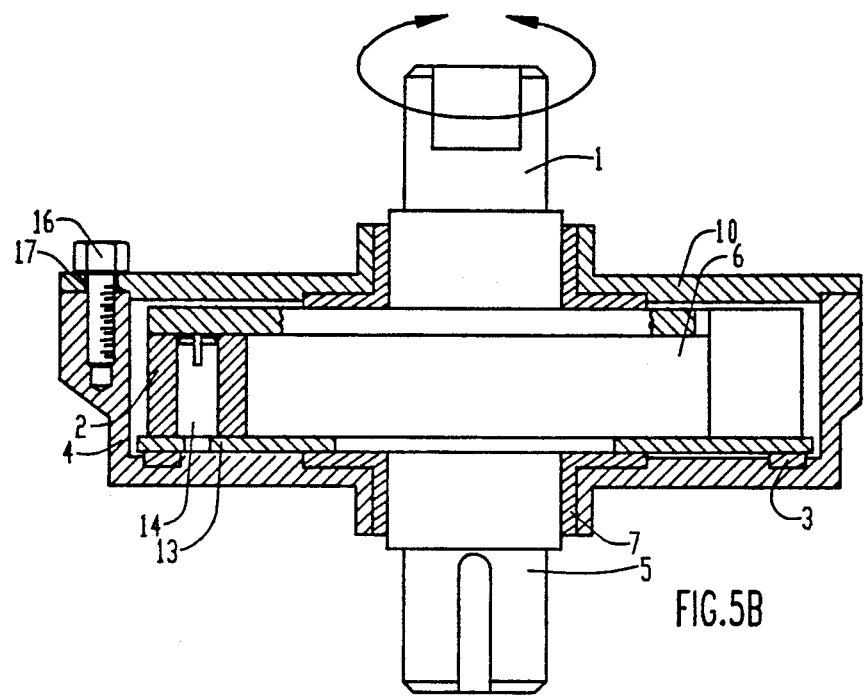
FIGS. 5A and 5B show a plan view and an elevated section of a second embodiment of the device with means of pivoting over two points equipped with two brake-shoes.
Figure 5A:
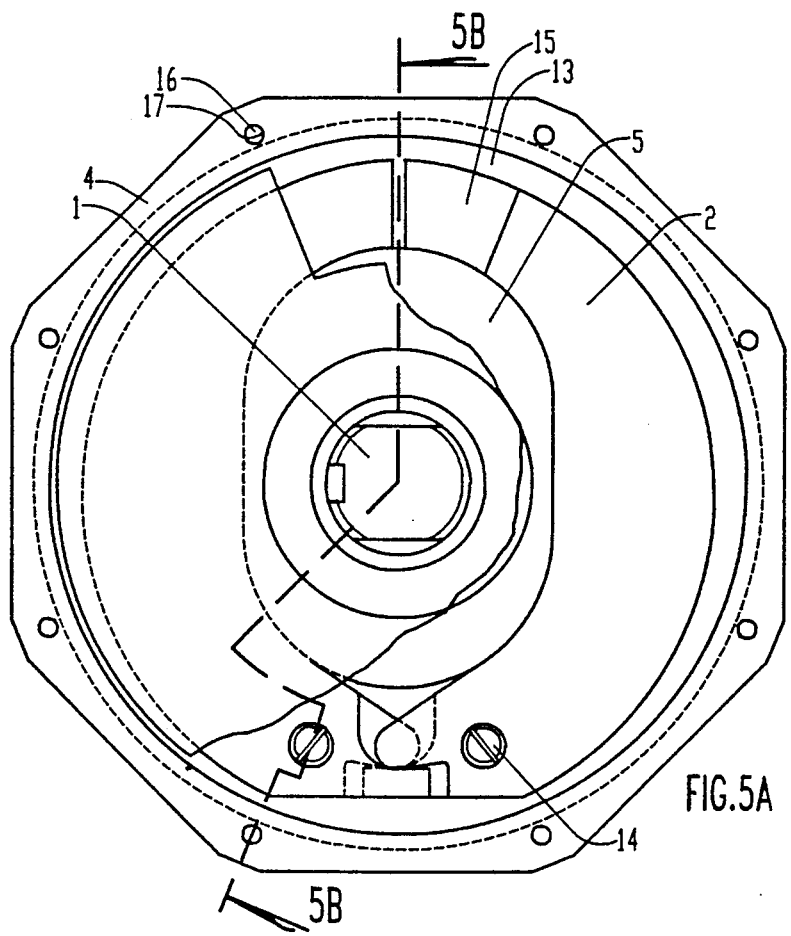
Figure 6B:
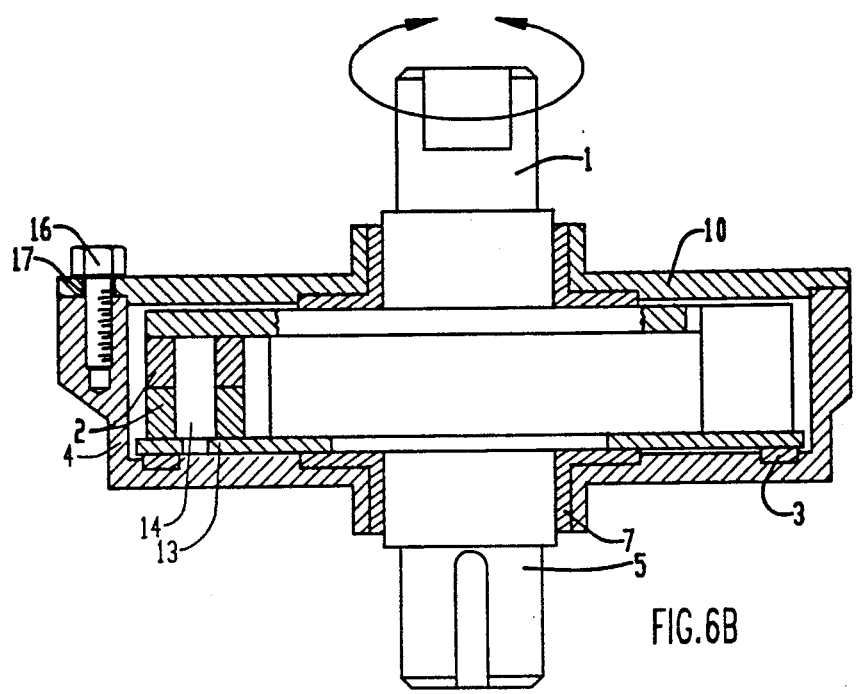
FIGS. 6A and 6B show a plan view and elevated section of a third embodiment of the device pivoting over one point equipped with two brake-shoes.
Figure 6A:
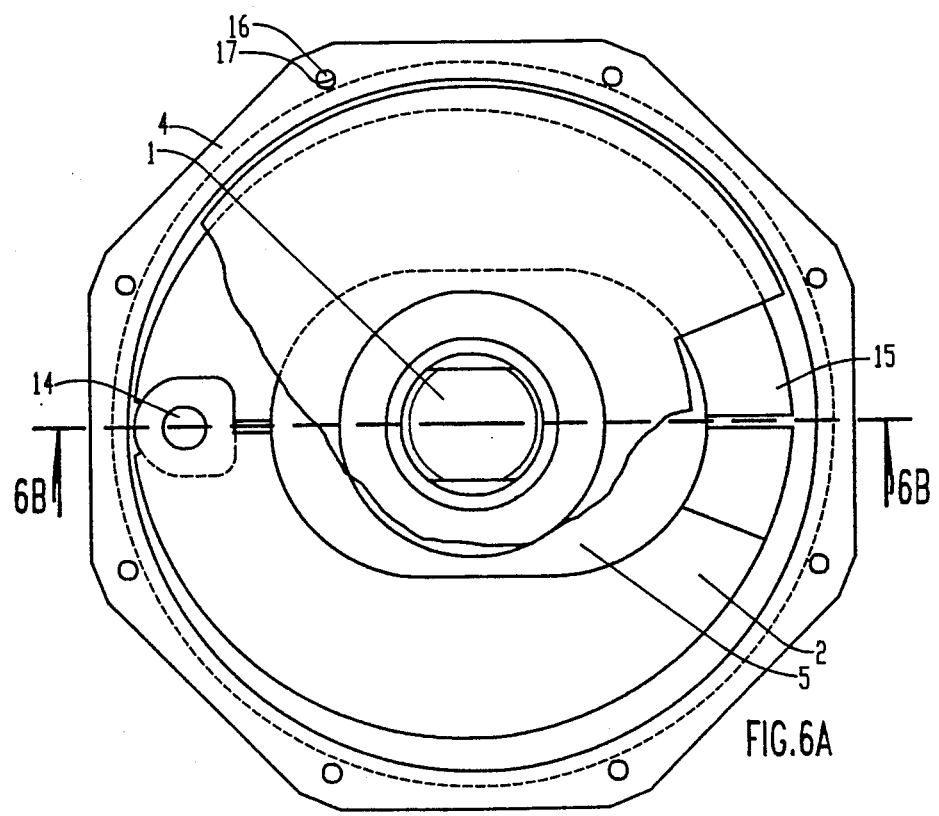
Figure 7B:
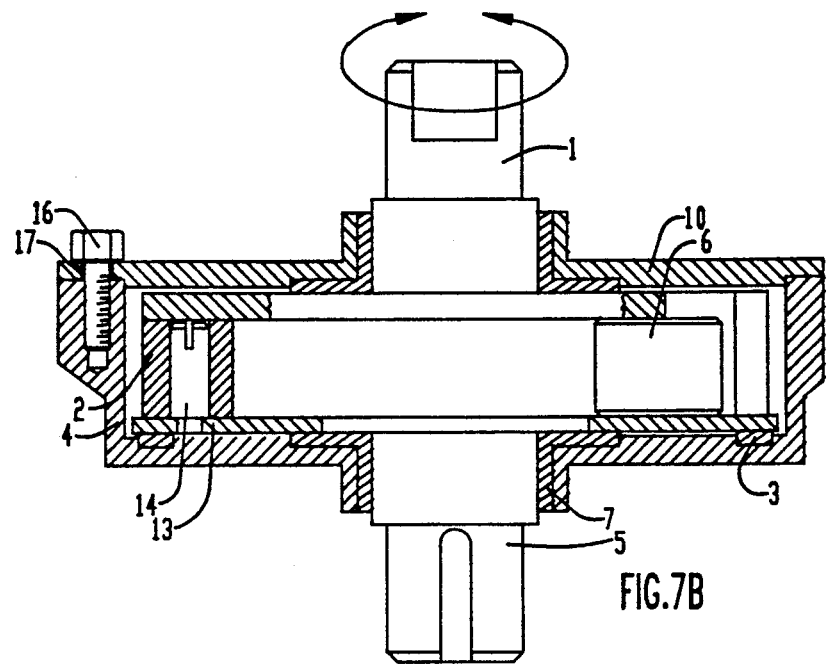
FIGS. 7A and 7B show a plan view and an elevated section of a fourth embodiment of the device, with mixed action through rollers and pivoting over two points with two brake-shoes.
Figure 7A:
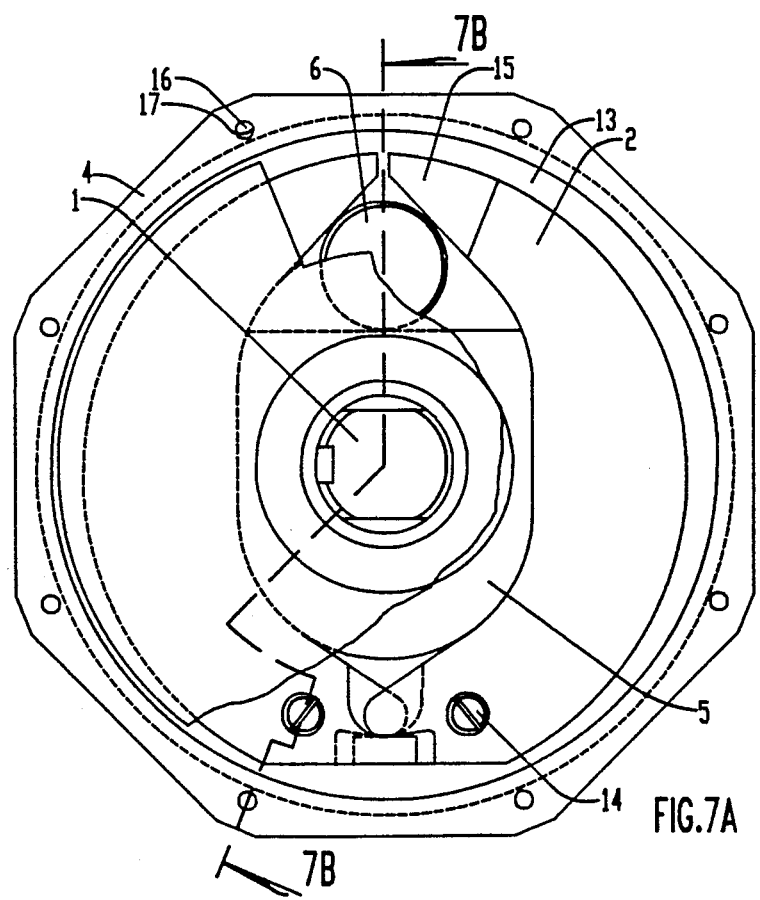
Figure 8B:
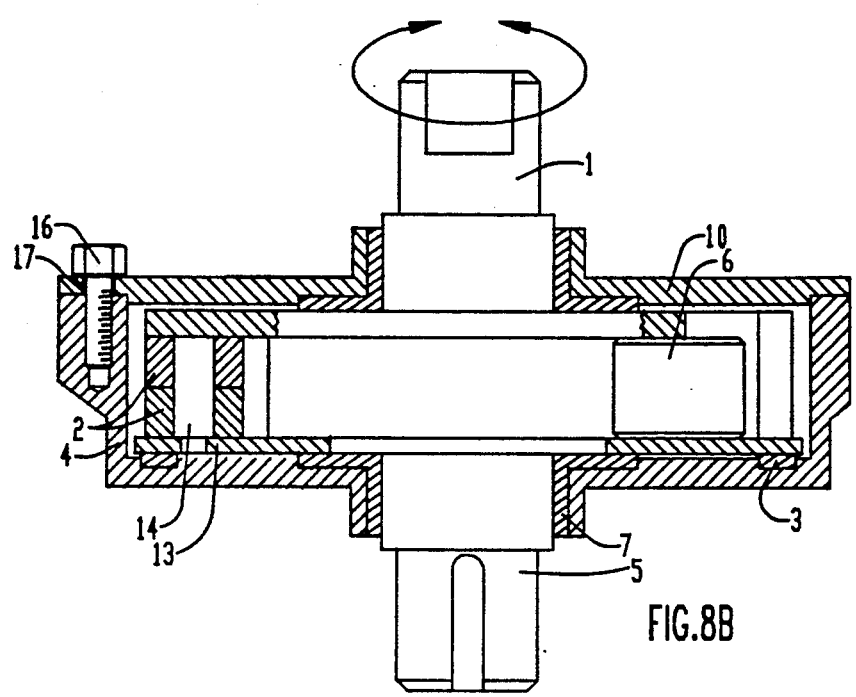
FIGS. 8A and 8B show a plan view and elevated section of a fifth embodiment of the device, with mixed action by rollers and pivoting over a point with two brake-shoes.
Figure 8A:
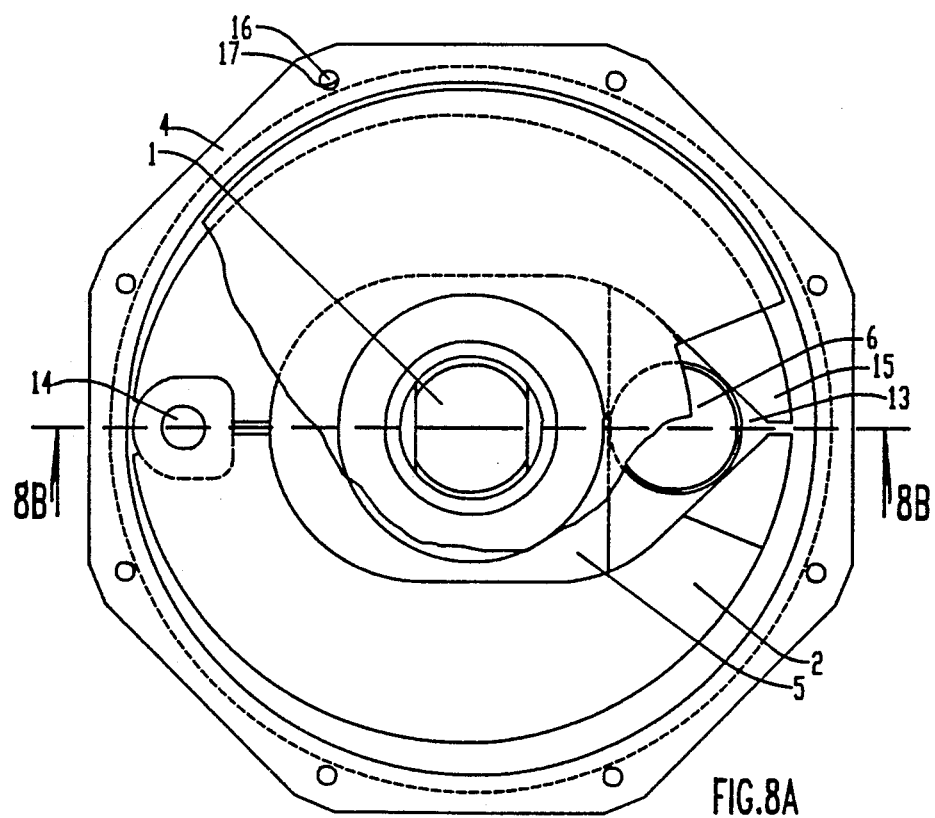
Figure 9B:
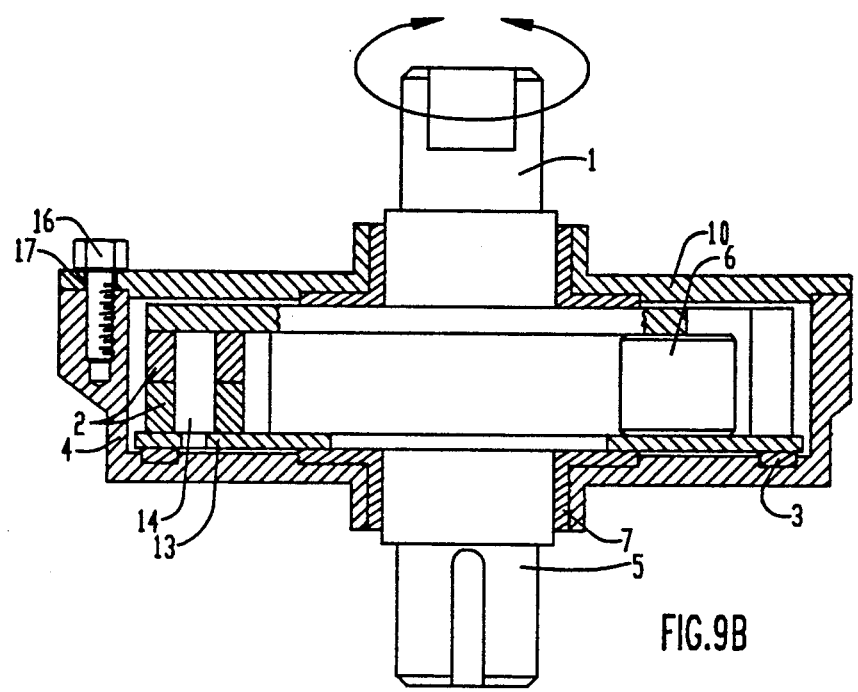
FIGS. 9A and 9B show a plan view and elevated section of a sixth embodiment of the device with mixed action by rollers and pivoting over opposed points with four brake-shoes.
Figure 9A:
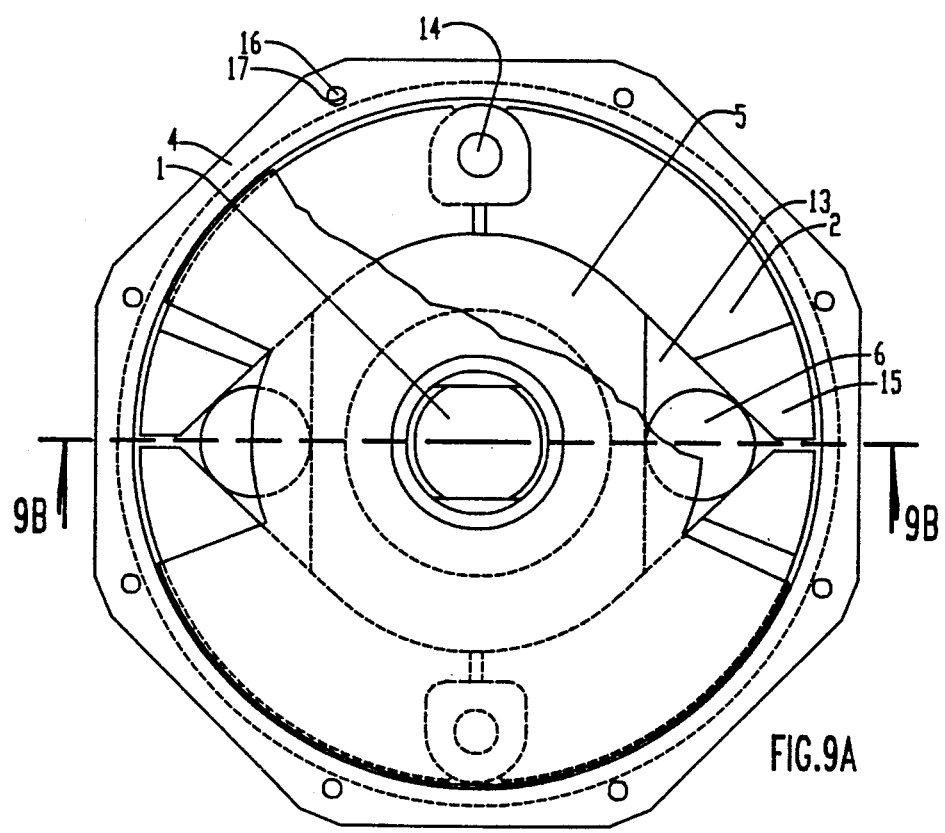
Figure 10B:
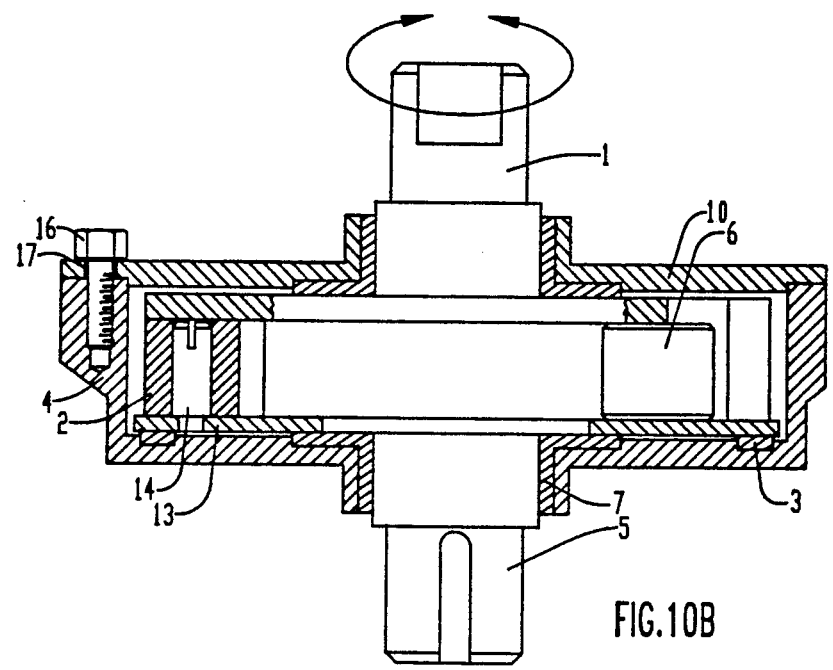
FIGS. 10A and 10B show a plan view and elevated section of a seventh embodiment the device with mixed action through rollers and pivoting over opposed points with four brake-shoes.
Figure 10A:
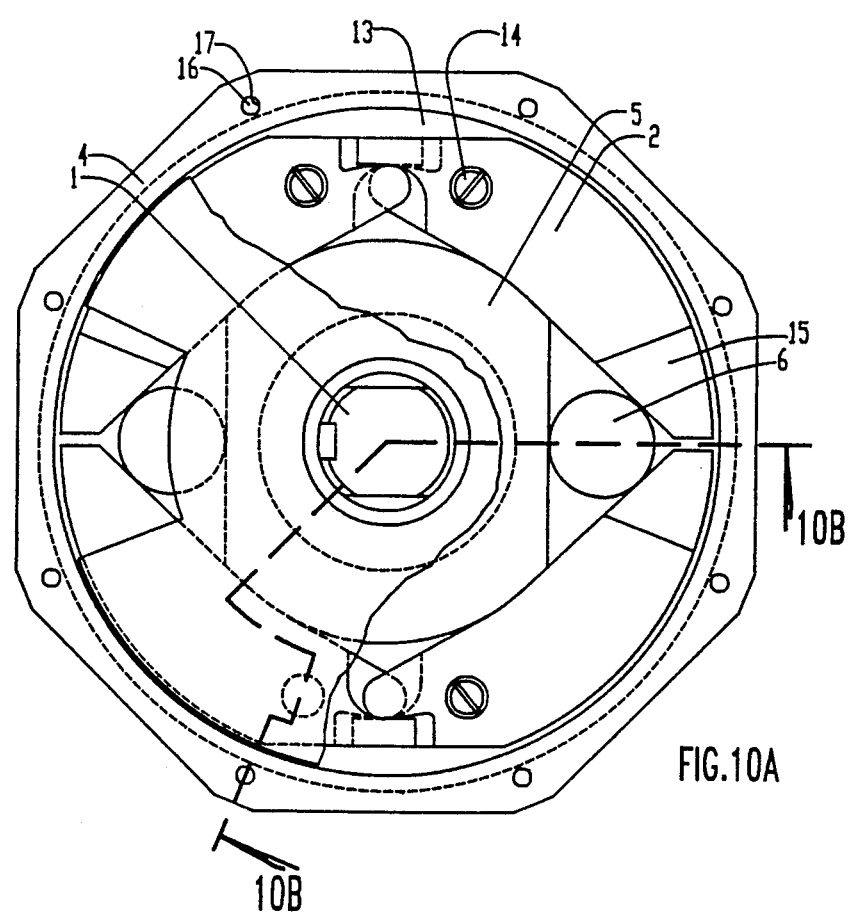
Figure 11B:
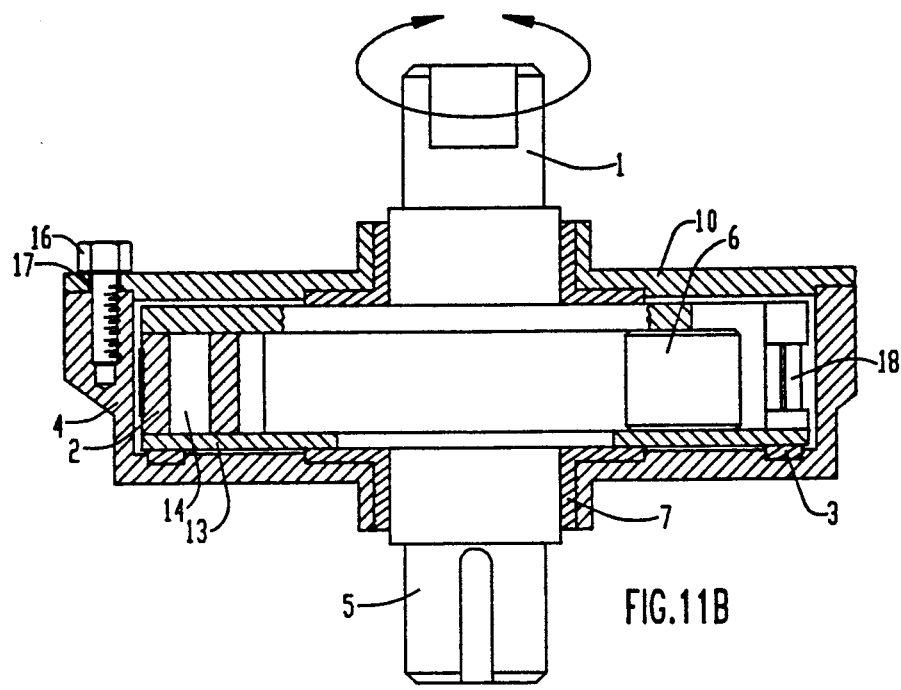
FIGS. 11A and 11B show a plan view and an elevated section of an eighth embodiment of the device, with a spring over the brake-shoes.
Figure 11A:
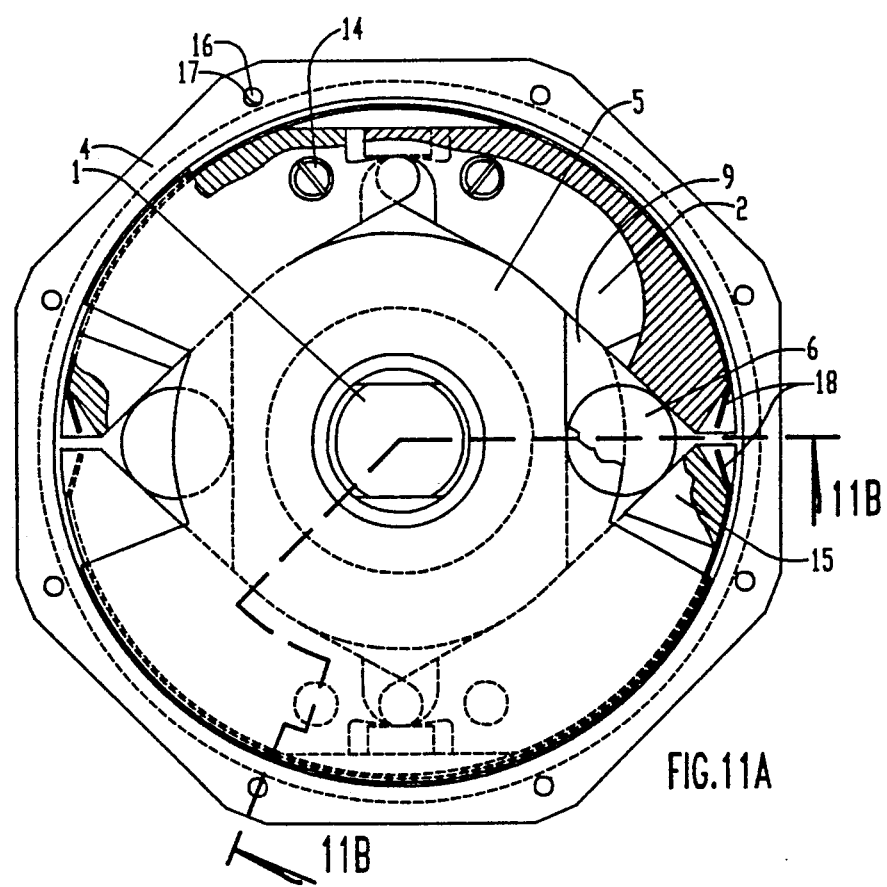

In those other versions of the mechanism shown in FIGS. 5-6, the functioning principle is kept, but the brake-shoes are jointed over pivoting points. The braking action is originated by means of the inside end of the output shaft (5) which, with its special cam profile, displaces the brake-shoes (2), thereby eliminating the pressure over the rolling track (3). In the device shown in FIGS. 7, 8, 9, 10 and 11, the brake-shoes displacement action is made through the inside edge of the output shaft (5), which has flat sides and rollers.

In these devices of FIGS. 5-11, the device has a support based comprised of the internal components (13), the corresponding pivoting points (14) with the brake-shoes edging (15). The jointing of the case (4) and the lid (10) is achieved by means of the lid fastening screws (16) and tightening washers (17) in the version with rollers, as well as in the one with pivoting action. In the version with mixed action through rollers with pivoting points, an adapting spring (18) is also provided.

We claim:

1. Regulatory and safety device to be used as an instantaneous anti-return system in both rotational directions, right and left, comprising: a cylindrical casing having a peripheral braking surface an input driving shaft extending through the casing, a plurality of annular brake-shoes mounted within the casing, a rolling track adjoining the casing upon which the brake-shoes are guided, an output driving shaft mounted on said input driving shaft, and the input shaft supporting the brake-shoes.

2. Regulatory and safety device according to claim 1 wherein the input driving shaft has a centrally located flat area with the shape of a disc with two or more peripheral projections of a rectangular shape.

3. Regulatory and safety device according to claim 2 wherein the brake-shoes have the shape of an annular segment with sharp and thinner edges and with a center area from which the input shaft projections extend, the brake-shoes being guided upon the rolling track and radially upon a number of rollers placed on flat areas of the body of the output shaft.

4. Regulatory and safety device according to claim 1 wherein the output shaft has a circular body which, at one end has the same diameter as that of the brake-shoes, with two or more flat areas thereon for the adaptation of pressure rollers, while the remaining longitudinal part of the output shaft has a lesser diameter with the central part having a passing hole of the same diameter as that of the end part of the input driving shaft.

5. Regulatory and safety device according to claim 1 wherein the output shaft has a body, and the input driving shaft, the brake-shoes, the rollers and the body of the output shaft are organized and assembled upon a circular case, fastened to a support lid which absorbs forces produced when the device is functioning.

6. Regulatory and safety device to be used as an instantaneous anti-return system in both left and right directions of rotation comprising: a cylindrical casing having a peripheral braking surface; a plurality of annular brake shoes mounted with in the casing; a rolling track adjoining the casing upon which the brakeshoes are guided; an input shaft extending into the casing and having one end coupled to the brake-shoes; an output shaft mounted on the input shaft; the brake-shoes being disposed so as to pivot over pre-determined points which act as rotating points for the opening and closing of the brake-shoes, and keeping a constant position between the brake-shoes, the input shaft and the output shaft.

7. Regulatory and safety device comprising: a cylindrical casing having a peripheral braking surface; a plurality of annular brake shoes mounted within the casing; a rolling track adjoining the casing upon which the brake-shoes are guided; an input shaft extending into the casing and having one end coupled to the brake-shoes; an output shaft mounted on the input shaft; an adaptation spring located over a peripheral case and on the external diameter of the brake-shoes.

* * * * *